April 23, 1929.  R. H. MUELLER  1,710,267
COUPLING FOR CORPORATION STOPS
Filed Oct. 26, 1925
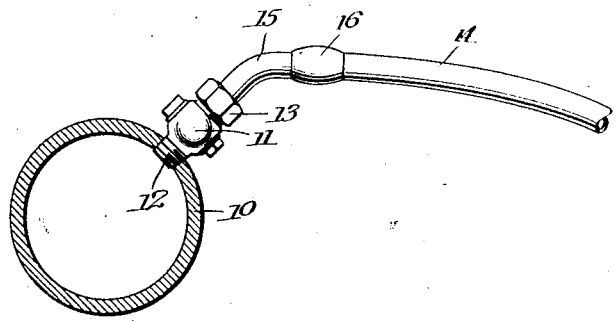
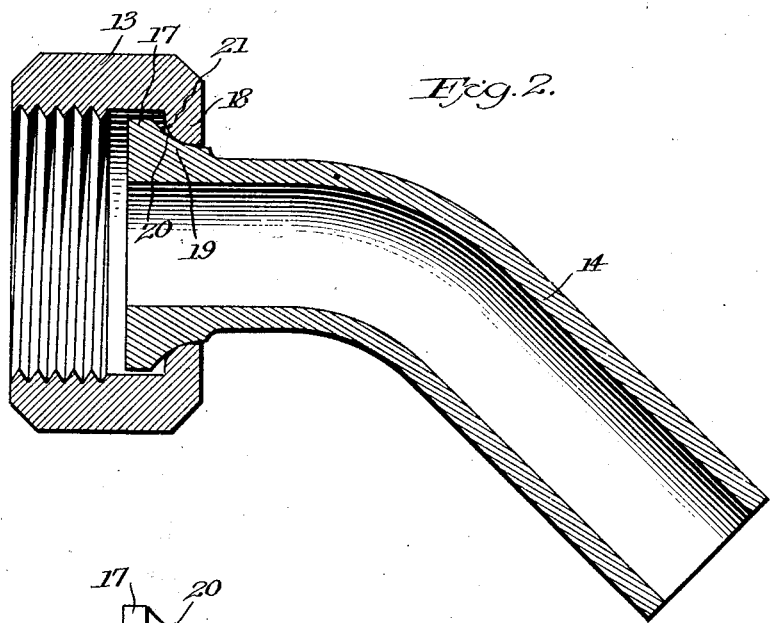
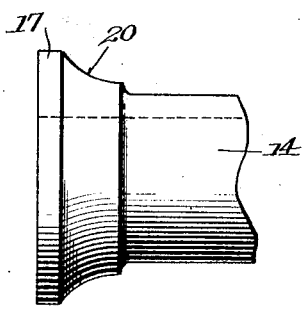
Inventor
Robert H. Mueller
By Cushman, Bryant Derby
Attorneys Patented Apr. 23, 1929.

1,710,267

UNITED STATES PATENT OFFICE.

ROBERT H. MUELLER, OF DECATUR, ILLINOIS, ASSIGNOR TO ADOLPH MUELLER, TRUSTEE, OF DECATUR, ILLINOIS.

COUPLING FOR CORPORATION STOPS.

Application filed October 26, 1925. Serial No. 64,915.

The present invention relates to couplings, and more particularly to couplings ordinarily employed for uniting a pipe with a stop valve.

Heretofore, couplings of this type have consisted of a collar internally threaded to fit upon the nipple of the corporation stop, and a pipe member having its end fitting within the collar and formed with an outwardly projecting flange which constitutes a shoulder to coact with an inturned flange on the collar. The pipe flange projects outwardly at substantially a right angle to the pipe and makes with the pipe wall a sharp angle of approximately 90°.

It has been found that this old style coupling when subjected to strain, for instance, under settling or shifting of the earth, tends to tear or break at the angle which the flange makes with the pipe wall, due probably to the fact that the strain is localized along the line of the angle which is, in effect, the beginning of a tear.

The object of the present invention is to provide a coupling of this same general type, but in which there will be no tendency of the pipe flange to separate or tear under the strains and stresses incident to ordinary use of the coupling.

The invention comprises broadly the elimination, in a coupling of this type, of the sharp angle which the pipe flange makes with the pipe wall by forming behind the flange a fillet portion to be engaged by the inturned flange of the collar and having a concavely curved surface to contact with the collar flange.

Furthermore, it has been found desirable to curve the contacting surface on the collar, preferably in the direction opposite to the curvature of the fillet surface which it engages, whereby the straight pull or separating stress exerted upon the flange of the old type of coupling will be converted into a rolling or rocking action. That is to say, any slight movement of the pipe end within the collar will cause the fillet surface to rock over the contact surface of the coupling, and the strain, instead of being at a right angle to the rear face of the flange, will be distributed over the fillet surface.

Briefly, the present invention seeks to strengthen the coupling by reinforcing the pipe end in a manner which will convert the tearing stresses into forces which will not have the effect of severing or tearing the end flange of the pipe along its line of juncture with the pipe wall.

In the accompanying drawings, there is shown a preferred embodiment of the invention, and in these drawings:

Figure 1 is a cross sectional view of a main showing a corporation stop and the coupling joining a pipe therewith.

Figure 2 is a longitudinal sectional view of the coupling.

Figure 3 is a fragmentary elevational view of the end of the pipe member of the coupling.

Referring to the drawings for a more detailed description, 10 indicates a main and 11 a corporation stop fitted therein by means of a threaded nipple 12 thereon, its other nipple serving to receive the collar 13 of the coupling which joins a service pipe 14 to the stop.

The coupling comprises the usual collar 13 and a pipe member 15 which may be connected to the supply pipe 14, as by a wiped joint 16. Within the collar 13 the pipe member 15 of the coupling has the usual outwardly projecting flange 17 coacting with an inturned flange 18 on the collar.

It will be noted, however, that the flange 17 does not join the pipe wall at an angle of 90°, as is customary, with the flange fitting flush against the inner face of the collar flange 18. Such a construction is objectionable since a sharp angle of juncture between the flange and pipe, with the faces of the flange fitting flush against one another, serves to create stresses at a right angle to the rear face of the pipe flange, which cause the pipe to tear along its line of juncture with the flange as has been heretofore explained.

To avoid this objection, the present invention contemplates the provision of a fillet section 19 behind the flange 17, the fillet having a contact surface 20 which is curved, preferably concavely, to cooperate with the contact surface 21 on the flange 18 of the collar. It will be observed that the flange 18 has its contact surface 21 curved oppositely to the surface 20 of the fillet section and preferably the radius of curvature of one of surfaces, in the present instance, the collar surface, is substantially smaller than the radius of curvature of the other surface.

When the coupling is tightened, as illustrated in Figures 1 and 2, there will be a close contact between the concave fillet surface 20 and the convex collar surface 21, and any slight movement of either the collar or the pipe member, or stresses which will tend to create such movement, will not be localized along a sharp line where the flange of the pipe joins the pipe wall as in the old form of coupling. Instead, any movement will result in a rolling or rocking action of the two curved surfaces, one over the other, and will be distributed throughout the fillet section.

It has been found that this type of coupling will not weaken under the ordinary stress resulting for instance, from shifting and settling of the earth which not infrequently causes breakage or tearing of the metal in the form of coupling heretofore used, and this, of course, is extremely objectionable, since any break at once starts a leak and necessitates excavation in order to make a new connection.

Obviously, variation in the exact structure illustrated and described may be made without departing from the invention which is defined in the following claim.

I claim—

In a coupling for use with corporation stops and the like, a collar member having an inturned flange provided with a convex curved fillet contacting surface to engage a pipe section, and a pipe section fitting freely within said collar, whereby the latter may rotate thereon, having an outwardly and right angularly projecting flange in said collar and an integral fillet behind said flange provided with a concavely curved surface complementary to the convexly curved surface on the collar, the curved fillet surface on the pipe extending beyond the contacting surface on the collar at opposite sides of the latter, the radius of curvature of said pipe fillet surface being substantially longer than the radius of curvature on said inturned flange, and the periphery of the flange within said collar being spaced from the inner side of the circumferential wall of the collar whereby the collar is free to rock on the pipe.

In testimony whereof I have hereunto set my hand.

ROBERT H. MUELLER.